(12) United States Patent
Kontani et al.

(10) Patent No.: US 12,238,174 B2
(45) Date of Patent: Feb. 25, 2025

(54) IN-VEHICLE SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Tsuyoshi Kontani, Yokkaichi (JP); Shinichi Tanabe, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 451 days.

(21) Appl. No.: 17/756,915

(22) PCT Filed: Nov. 24, 2020

(86) PCT No.: PCT/JP2020/043697
§ 371 (c)(1),
(2) Date: Jun. 6, 2022

(87) PCT Pub. No.: WO2021/111928
PCT Pub. Date: Jun. 10, 2021

(65) Prior Publication Data
US 2023/0010094 A1    Jan. 12, 2023

(30) Foreign Application Priority Data
Dec. 6, 2019    (JP) .................. 2019-221518

(51) Int. Cl.
*H04L 67/12*    (2022.01)
*B60R 16/023*    (2006.01)
*H04B 3/36*    (2006.01)

(52) U.S. Cl.
CPC ............ *H04L 67/12* (2013.01); *B60R 16/023* (2013.01); *H04B 3/36* (2013.01)

(58) Field of Classification Search
CPC ....... H04L 67/12; B60R 16/023; B60R 16/02; H04B 3/36
See application file for complete search history.

(56) References Cited

U.S. PATENT DOCUMENTS

2017/0008466 A1* 1/2017 Kikuchi .............. B60R 16/0207
2019/0126864 A1    5/2019 Takamatsu et al.

FOREIGN PATENT DOCUMENTS

| JP | 2005-289375 A | 10/2005 |
|----|---------------|---------|
| JP | 2012-76630 A  | 4/2012  |
| JP | 2015-101184 A | 6/2015  |

OTHER PUBLICATIONS

International Search Report, Application No. PCT/JP2020/043697, mailed Feb. 2, 2021. ISA/Japan Patent Office.

* cited by examiner

*Primary Examiner* — Jeffrey M Shin
(74) *Attorney, Agent, or Firm* — Honigman LLP

(57) ABSTRACT

An in-vehicle system installed in a vehicle including a plurality of relay devices, wherein the plurality of relay devices are installed in a plurality of installation areas partitioned in the vehicle and include a plurality of connectors corresponding in number to the plurality of installation areas, the number and shapes of the plurality of connectors are standardized between the plurality of relay devices, harnesses extended from the plurality of installation areas are connected to the plurality of connectors either directly or via relay connectors, the plurality of relay devices include: a first relay device in which harnesses extended from different installation areas are connected to the plurality of connectors; and a second relay device other than the first
(Continued)

relay device, and the number of relay connectors connected to the first relay device is no greater than the number of relay connectors connected to the second relay device.

9 Claims, 7 Drawing Sheets

IN-VEHICLE SYSTEM

CROSS-REFERENCE TO RELATED APPLICATIONS

This application is the U.S. national stage of PCT/JP2020/043697 filed on Nov. 24, 2020, which claims priority of Japanese Patent Application No. JP 2019-221518 filed on Dec. 6, 2019, the contents of which are incorporated herein.

TECHNICAL FIELD

The present disclosure relates to an in-vehicle system.

BACKGROUND

In-vehicle electronic control units (ECUs) for controlling in-vehicle devices, such as those of the powertrain system for engine control, etc., and those of the body system for air-conditioner control, etc., are installed in a vehicle. A power-supply distribution system (in-vehicle system) including a plurality of power-supply distribution devices for distributing power from a power source to such in-vehicle ECUs is installed in the vehicle (for example, see Patent Document 1).

The power-supply distribution devices included in the in-vehicle system disclosed in Patent Document 1 do not have a connector configuration in which consideration is given to the areas of the vehicle in which the plurality of power-supply distribution devices are installed, and no consideration is made regarding optimization of the connector configuration in a case in which these power-supply distribution devices are standardized.

An aim of the present disclosure is to provide an in-vehicle system including a plurality of relay devices that are installed in a plurality of areas in a vehicle and that have an optimized connector configuration.

SUMMARY

An in-vehicle system according to one aspect of the present disclosure is an in-vehicle system that is installed in a vehicle and that includes a plurality of relay devices, wherein the plurality of relay devices are installed in a plurality of installation areas partitioned in the vehicle and include a plurality of connectors corresponding in number to the plurality of installation areas, the number and shapes of the plurality of connectors are standardized between the plurality of relay devices, harnesses extended from the plurality of installation areas are connected to the plurality of connectors either directly or via relay connectors, the plurality of relay devices include: a first relay device in which harnesses extended from different installation areas are connected to the plurality of connectors; and a second relay device other than the first relay device, and the number of relay connectors connected to the first relay device is no greater than the number of relay connectors connected to the second relay device.

Advantageous Effects of Invention

According to one aspect of the present disclosure, an in-vehicle system including a plurality of relay devices that are installed in a plurality of areas in a vehicle and that have an optimized connector configuration can be provided.

DETAILED DESCRIPTION OF PREFERRED EMBODIMENTS

First, aspects of embodiment of the present disclosure will be listed and described. Furthermore, the embodiments described below may at least be partially combined as appropriate.

First Aspect

An in-vehicle system according to a first aspect of the present disclosure is an in-vehicle system that is installed in a vehicle and that includes a plurality of relay devices, wherein the plurality of relay devices are installed in a plurality of installation areas partitioned in the vehicle and include a plurality of connectors corresponding in number to the plurality of installation areas, the number and shapes of the plurality of connectors are standardized between the plurality of relay devices, harnesses extended from the plurality of installation areas are connected to the plurality of connectors either directly or via relay connectors, the plurality of relay devices include: a first relay device in which harnesses extended from different installation areas are connected to the plurality of connectors; and a second relay device other than the first relay device, and the number of relay connectors connected to the first relay device is no greater than the number of relay connectors connected to the second relay device.

According to the first aspect, in the plurality of relay devices including the first and second relay devices, the number and shapes of the plurality of connectors included in the relay devices are standardized; in other words, the in-vehicle system can be configured using relay devices of the same model. In addition, the number of relay connectors connected to the first relay device is no greater than the number of relay connectors connected to the second relay device. Accordingly, a reduction in component cost and vehicle-body weight can be achieved by optimizing the connector configuration of the relay devices and reducing the number of harness circuits while standardizing (i.e., using the same components for) product specifications including at least the connector configuration of the plurality of relay devices.

Second Aspect

In the in-vehicle system according to a second aspect of the present disclosure, a harness extended from a different installation area is connected to each of the connectors of the first relay device.

According to the second aspect, due to harnesses extended from mutually different installation areas being connected to the connectors of the first relay device, the number and types, such as shapes, of the connectors of the first relay device can be optimized with respect to harnesses extended from mutually different installation areas, or in other words, can be optimized with respect to in-vehicle loads connected to the harnesses. The in-vehicle system can be efficiently constructed by optimizing connector configuration based on the first relay device and using the first relay device and the second relay device, which has the same connector configuration as the first relay device.

Third Aspect

In the in-vehicle system according to a third aspect of the present disclosure, the number of harnesses extended and connected from installation areas other than the installation area in which the relay device itself is installed is greatest in the first relay device of the plurality of relay devices.

According to the third aspect, the number of relay connectors connected to the first relay device having connected thereto the greatest number of harnesses extended from installation areas other than the installation area in which the device itself is installed is no greater than the number of relay connectors connected to the second relay device. Thus, an increase in the number of harness circuits due to harnesses being split by relay connectors can be suppressed. Accordingly, a reduction in component cost and vehicle-body weight can be achieved by optimizing the connector configuration in the relay devices and reducing the number of harness circuits while standardizing (i.e., using the same components for) product specifications including at least the connector configuration of the plurality of relay devices.

Fourth Aspect

In the in-vehicle system according to a fourth aspect of the present disclosure, the number of relay connectors connected to the first relay device is zero, and harnesses extended from the plurality of installation areas are directly connected to the plurality of connectors of the first relay device.

According to the fourth aspect, due to the number of relay connectors connected to the first relay device being zero, harnesses extended from the plurality of installation areas are directly connected to the connectors of the first relay device. Accordingly, an increase in the number of harness circuits due to harnesses being split by relay connectors can be suppressed to a further extent.

Fifth Aspect

In the in-vehicle system according to a fifth aspect of the present disclosure, in the first relay device, the harnesses extended from the plurality of installation areas are connected to the plurality of connectors of the first relay device so that a plurality of harnesses extended from different installation areas are not present together at the same connector.

According to the fifth aspect, one or more harnesses extended from the same installation area are connected to each of the plurality of connectors of the first relay device, and connection is established so that harnesses extended from different installation areas are not present together at any one of the plurality of connectors. The first relay device is the relay device having connected thereto the greatest number of harnesses extended from installation areas other than the installation area in which the device itself is installed. Accordingly, by connecting one or more harnesses extended from the same installation area to each of the plurality of connectors of the first relay device, the connector configuration of the first relay device can be optimized, relay connectors connected to the first relay device can be eliminated, and an increase in the number of harness circuits connected to the first relay device can be suppressed.

Sixth Aspect

In the in-vehicle system according to a sixth aspect of the present disclosure, the relay connectors are each interposed between a harness extended from an installation area other than the installation area in which a relay device itself is installed and a connector to which the harness is to be connected.

According to the sixth aspect, a relay connector is interposed between a harness extended from an installation area other than the installation area in which a relay device itself is installed and a connector to which the harness is to be connected. The relay connector and the connector are connected via a harness that is separate from the harness extended from the installation area other than the installation area in which the relay device itself is installed. Accordingly, even if a plurality of harnesses extended from different installation areas are connected to a connector and a plurality of harnesses extended from different installation areas are present together at the connector, one of the harnesses extended from different installation areas is connected to the connector via a relay connector. Thus, the plurality of harnesses extended from different installation areas can be split by means of relay connectors.

Seventh Aspect

In the in-vehicle system according to a seventh aspect of the present disclosure, the plurality of installation areas include: an engine-room area in which driving-system in-vehicle devices of the vehicle are installed; a floor area beneath a floor panel of the vehicle; and an instrument-panel area located between the engine-room area and the floor area, and the first relay device is installed in the instrument-panel area.

According to the present aspect, the plurality of installation areas include an engine-room area, an instrument-panel area, and an instrument-panel area located between the engine-room area and the floor area, and the first relay device having connected thereto the greatest number of harnesses extended from installation areas other than the installation area in which the relay device itself is installed is installed in the instrument-panel area. Since the instrument-panel area is located between the engine-room area and the floor area, harnesses extended from the engine-room area and the floor area, which correspond to the installation areas other than the installation area in which the relay device itself is installed, can be efficiently routed to the first relay device installed in the instrument-panel area.

Eighth Aspect

In the in-vehicle system according to an eighth aspect of the present disclosure, the plurality of relay devices each include a plurality of fuses that are connected to the plurality of connectors, and the types and number of the plurality of fuses are standardized between the plurality of relay devices.

According to the eighth aspect, the plurality of relay devices can be made to function as fuse boxes since the relay devices each include a plurality of fuses connected to the plurality of connectors. Erroneous assembly in the manufacturing process can be prevented since the types and number of fuses are standardized between the plurality of relay devices.

Ninth Aspect

In the in-vehicle system according to a ninth aspect of the present disclosure, the plurality of relay devices include communication ports for communicating with in-vehicle ECUs installed in the vehicle, and the number and shapes of the communication ports are standardized between the plurality of relay devices.

According to the ninth aspect, the plurality of relay devices include communication portions for communicating with in-vehicle ECUs installed in the vehicle, and erroneous assembly during the manufacturing process can be prevented since the number and shapes of the communication ports are standardized between the plurality of relay devices.

The present disclosure will be described in detail based on drawings illustrating embodiments thereof. In-vehicle systems S according to the embodiments of the present disclosure will be described in the following with reference to the drawings. Note that the present disclosure is not limited to these examples, and is intended to include all modifications that are indicated by the claims and are within the meaning and scope of equivalents of the claims.

Embodiment 1

Figure 1:
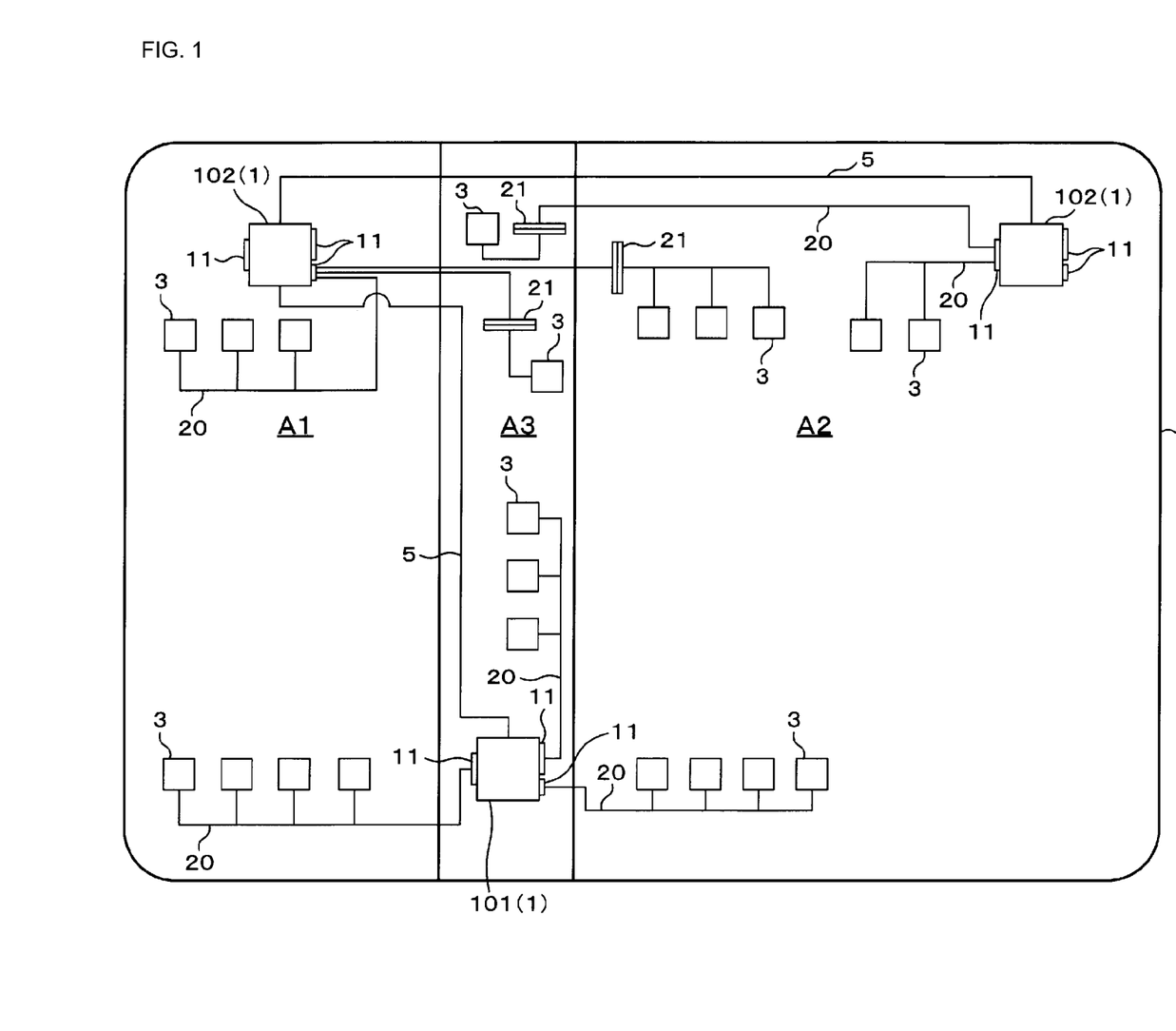
FIG. 1 is a schematic diagram illustrating an in-vehicle system according to embodiment 1.

FIG. 1 is a schematic diagram illustrating an in-vehicle system S according to embodiment 1. The in-vehicle system S is installed in a vehicle C, and includes a plurality of relay devices 1 that are connected so as to be capable of communicating with one another. The plurality of relay devices 1 each have a plurality of in-vehicle loads 3 connected thereto. Each relay device 1 relays power or communication data to the in-vehicle loads 3 connected thereto.

Upon these relay devices 1 and in-vehicle loads 3 being installed in the vehicle C, the vehicle C is partitioned into a plurality of installation areas. Each relay device 1 is installed in one installation area, and is connected to in-vehicle loads 3 that are installed in the same installation area as the device itself or in installation areas different from the installation area in which the device itself is installed.

A relay device 1 and an in-vehicle load 3 are connected via a harness 20, and the male connector of the harness 20 is inserted into a connector 11 (female connector) of the relay device 1, for example. Note the female connector may be on the harness 20-side and the male connector may be on the relay device 1-side. The harness 20 may be a single cable connected to each in-vehicle load 3, or may be a bundle of cables connected to a plurality of in-vehicle loads 3. The harness 20 includes at least one of; a power cable for supplying power from the relay device 1 to the in-vehicle load 3; and a communication cable, such as a CAN bus or an Ethernet (registered trademark) cable, for data communication between the relay device 1 and the in-vehicle load 3. The harness 20 may include both a power cable and a communication cable.

The forms of connection between harnesses 20 and relay devices 1 include a form in which a harness 20 and a relay device 1 are directly connected and a form in which a harness 20 and a relay device 1 are connected via a relay connector 21. If a plurality of harnesses 20 extended from different installation areas are connected to a relay device 1 and the plurality of harnesses 20 are connected to the same connector 11 of the relay device 1, one of the harnesses 20 is connected to the connector 11 via a relay connector 21.

A relay connector 21 provides connection and functions as a relay between two harnesses 20, and is also called a wire-to-wire connector (W-to-W connector). As a result of a relay device 1 and an in-vehicle load 3 being connected via a relay connector 21, the harness 20 connecting the relay device 1 and the in-vehicle load 3 is split by the relay connector 21. In other words, the relay connector 21 and a connector 11 of the relay device 1 are connected via a harness 20 that is separate from the harness 20 directly connected to the in-vehicle load 3 (the harness 20 extended from an installation area). As a result of the harnesses 20 being split by relay connectors 21 in such a manner, the number of circuits of harnesses 20 is increased.

In regard to the in-vehicle routing of harnesses 20, there is a limitation in that, if a plurality of harnesses 20 from different installation areas are to be connected to the same connector 11 out of the plurality of connectors 11 included in a relay device 1, the plurality of harnesses 20 cannot all be directly connected to the same connector 11. Thus, if a plurality of harnesses 20 extended from different installation areas are to be connected to the same connector 11, one of the harnesses 20 is directly connected to the connector 11, and the rest of the harnesses 20 are connected to the connector 11 via relay connectors 21. The one harness 20 that is directly connected to the connector 11 may be a harness 20 extended from the same installation area as the installation area in which the relay device 1 itself is installed. By adopting a configuration in which the rest of the harnesses 20 are connected to the connector 11 via relay connectors 21 and are split by the relay connectors 21, a situation in which a plurality of harness 20 extended from different installation areas are directly connected to the same connector 11 can be avoided.

For example, the plurality of installation areas include an engine-room area A1, an instrument-panel area A3, and a floor area A2. The engine-room area A1 indicates an area formed by an engine room, and in the engine room area A1, in-vehicle loads 3 (driving-system in-vehicle devices) that are in-vehicle ECUs, in-vehicle devices for the powertrain system, such as a driving motor, or the like are installed, for example. The floor area A2 indicates an area partitioned by a floor panel or an area inside a seat, and in the floor area A2, in-vehicle loads 3 that are in-vehicle ECUs, in-vehicle devices such as a seat-driving device, or the like are installed, for example. The instrument-panel area A3 indicates an area partitioned by an instrument panel, and in the instrument-panel area A3, in-vehicle loads 3 that are in-vehicle ECUs, in-vehicle devices such as a human machine interface (HMI) device, an air conditioner, or meters, or the like are installed, for example. The instrument-panel area A3 is located between the engine-room area A1 and the floor area A2.

Each of the plurality of relay devices 1 is an electric distribution box that relays, distributes, and thereby supplies power output from a power storage device 4 (see FIG. 2) to in-vehicle loads 3 connected thereto via harnesses 20, or a gateway or an Ether switch that relays data communication between the in-vehicle loads 3. The relay devices 1 may be a power LAN box (PLB) or an area control unit (ACU) having both the functions of an electric distribution box and a gateway, etc.

The plurality of relay devices 1 include a first relay device 101 and a second relay device 102. In the illustration of the present embodiment, the in-vehicle system S includes one first relay device 101 and two second relay devices 102. The first relay device 101 and the plurality of second relay devices 102 are connected to communication lines 5, which are Ethernet cables or the like, for example, so as to be capable of communicating with one another, and each relay communication between in-vehicle loads 3 such as sensors or in-vehicle ECUs that are connected thereto.

The relay devices 1 (the first relay device 101 and the second relay device 102) each include a plurality of connectors 11 corresponding to the plurality of installation areas. While a detailed configuration of the first relay device 101 and the second relay device 102 will be described later, the number and types, such as shapes, of the connectors 11 included in the first relay device 101 and the second relay device 102 are standardized. By standardizing the connectors 11 of the first relay device 101 and the second relay device 102 in such a manner, the in-vehicle system S can be configured using relay devices 1 of the same type and the component cost relating to the relay devices 1 can be reduced.

There is a correlation between the number of connectors 11 included in the relay devices 1 and the number of installation areas, and the number of connectors 11 and the number of installation areas may be the same. In the illustration of the present embodiment, the number of installation areas is three, namely the engine-room area A1, the floor area A2, and the instrument-panel area A3, and the number of connectors 11 included in each of the relay devices 1 (the first relay device 101 and the second relay device 102) is also three, and thus the numbers thereof match.

In the illustration of the present embodiment, the first relay device 101 is installed in the instrument-panel area A3, and a harness 20 extended from the instrument-panel area A3, a harness 20 extended from the floor area A2, and a harness 20 extended from the engine-room area A1 are connected to different connectors 11 of the first relay device 101.

Since harnesses 20 extended from the plurality of installation areas are connected to different connectors 11 of the first relay device 101, the harnesses 20 and the connectors 11 can be directly connected without interposing relay connectors 21 therebetween. Accordingly, in the first relay device 101, a situation in which harnesses 20 are split by relay connectors 21 can be avoided.

In the first relay device 101, the types, such as shapes, of the connectors 11 to which the harnesses 20 are connected are determined in accordance with the in-vehicle loads 3 to be connected via the harnesses 20. In other words, the connectors 11 of the first relay device 101 correspond to the plurality of installation areas, and include a connector 11 for the engine-room area A1, a connector 11 for the floor area A2, and a connector 11 for the instrument-panel area A3, for example.

A harness 20 extended from the engine-room area A1 is connected to the connector 11 for the engine-room area A1 in the first relay device 101. A harness 20 extended from the floor area A2 is connected to the connector 11 for the floor area A2 in the first relay device 101. A harness 20 extended from the instrument-panel area A3 is connected to the connector 11 for the instrument-panel area A3 in the first relay device 101. Harnesses 20 extended from mutually different installation areas are connected to the connectors 11 of the first relay device 101. In other words, a plurality of harnesses 20 extended from different installation areas are connected to the connectors 11 of the first relay device 101 so that the plurality of harnesses 20 are not present together at any same one connector 11 of the first relay device 101.

In this way, the number and types, such as shapes, of the connectors 11 of the first relay device 101 suitably or optimally correspond to the harnesses 20 connected thereto, or in other words, the in-vehicle loads 3 connected to the harnesses 20. Accordingly, all of the connectors 11 of the first relay device 101 are used, and the connectors 11 of the first relay device 101 can be used as dedicated connectors 11 (dedicated connectors) specific to the plurality of installation areas.

In the illustration of the present embodiment, the second relay device 102 is installed in the engine-room area A1 and the floor area A2; in other words, the in-vehicle system S includes two second relay devices 102. As mentioned above, at least the configuration of the connectors 11, such as the number and types of the connectors 11, is standardized between the second relay device 102 and the first relay device 101, and for example, the second relay device 102 and the first relay device 101 may be devices of the same model.

Harnesses 20 extended from the engine-room area A1, the floor area A2, and the instrument-panel area A3 are connected to the second relay device 102 installed in the engine-room area A1. Since the configuration of the connectors 11 of the second relay device 102 and the first relay device 101 is standardized and optimized based on the first relay device 101, there are cases in which a plurality of harnesses 20 extended from different installation areas are connected to the same connector 11 when the plurality of harnesses 20 are connected to the second relay device 102. In the second relay device 102 in the engine-room area A1, the harnesses 20 extended from the engine-room area A1, the floor area A2, and the instrument-panel area A3 are connected to the same connector 11. The harness 20 extended from the engine-room area A1, which is the same installation area as that in which the device itself (the second relay device 102) is installed, is directly connected to a connector 11. The harnesses 20 extended from the floor area A2 and the instrument-panel area A3, which are installation areas different from the installation area in which the device itself (the second relay device 102) is installed, are each connected to the connector 11 via a relay connector 21.

Harnesses 20 extended from the floor area A2 and the instrument-panel area A3 are connected to the second relay device 102 installed in the floor area A2. In the second relay device 102 in the floor area A2, the harnesses 20 extended from the floor area A2 and the instrument-panel area A3 are connected to the same connector 11. The harness 20 extended from the floor area A2, which is the same installation area as that in which the device itself (the second relay device 102) is installed, is directly connected to the connector 11. The harness 20 extended from the instrument-panel area A3, which is an installation area different from the installation area in which the device itself (the second relay device 102) is installed, is connected to the connector 11 via a relay connector 21.

Even if a plurality of harnesses 20 extended from different installation areas are connected to the same connector 11, a plurality of harnesses 20 extended from installation areas different from the installation area in which the device itself is installed can each be split by connecting the harnesses 20 extended from the different installation areas to the connector 11 via relay connectors 21.

By connecting harnesses 20 to the connectors 11 of the second relay devices 102 via relay connectors 21 in such a manner, the connectors 11 of the second relay devices 102 can be used as common connectors 11 (common connectors) which, unlike the connectors 11 of the first relay device 101, are not specific to the plurality of installation areas and to which harnesses 20 extended from a plurality of installation areas are connected.

In the present embodiment, in the plurality of relay devices 1 including the first relay device 101 and the second relay device 102, the number and types, such as shapes, of the connectors 11 are standardized based on the first relay device 101. In other words, the in-vehicle system S can be configured using relay devices 1 of the same model, and thus erroneous assembly of the relay devices 1 in the vehicle C can be prevented, and the component cost of the relay devices 1 can be reduced.

By adopting a configuration in which harnesses 20 extended from mutually different installation areas are directly connected to the connectors 11 of the first relay device 101, the number and types, such as shapes, of the connectors 11 can be made suitable or optimal based on the first relay device 101, and all of the connectors 11 of the first relay device 101 can be effectively used. By directly connecting harnesses 20 to all of the connectors 11, a situation in which the harnesses 20 are split by relay connectors 21 can be avoided, and the number of circuits can be reduced.

The number of in-vehicle loads 3 connected via harnesses 20 connected to the first relay device 101 may be greater than the number of in-vehicle loads 3 connected via harnesses 20 connected to the second relay device 102. In other words, of the relay devices 1 included in the in-vehicle system S, the first relay device 101 may have the greatest number of in-vehicle loads 3 connected thereto via harnesses 20. By determining the configuration of the connectors 11 of the relay device 1 such as the number and types of the connectors 11 based on the first relay device 101, which has the greatest number of in-vehicle loads 3 connected thereto via harnesses 20 as described above, the versatility required to use the relay device 1 as the second relay device 102 can be guaranteed.

In the present embodiment, the first relay device 101 is installed in the instrument-panel area A3. Since the instrument-panel area A3 is located between the engine-room area A1 and the floor area A2, the harnesses 20 extended from the engine-room area A1 and the floor area A2, which are installation areas different from the installation area in which the device itself is installed, can be routed efficiently when connected to the first relay device 101. In other words, by installing the first relay device 101 in the instrument-panel area A3, which is the installation area located at the center out of the plurality of installation areas, the harnesses 20 connected to the first relay device 101 can be routed efficiently.

Figure 2:
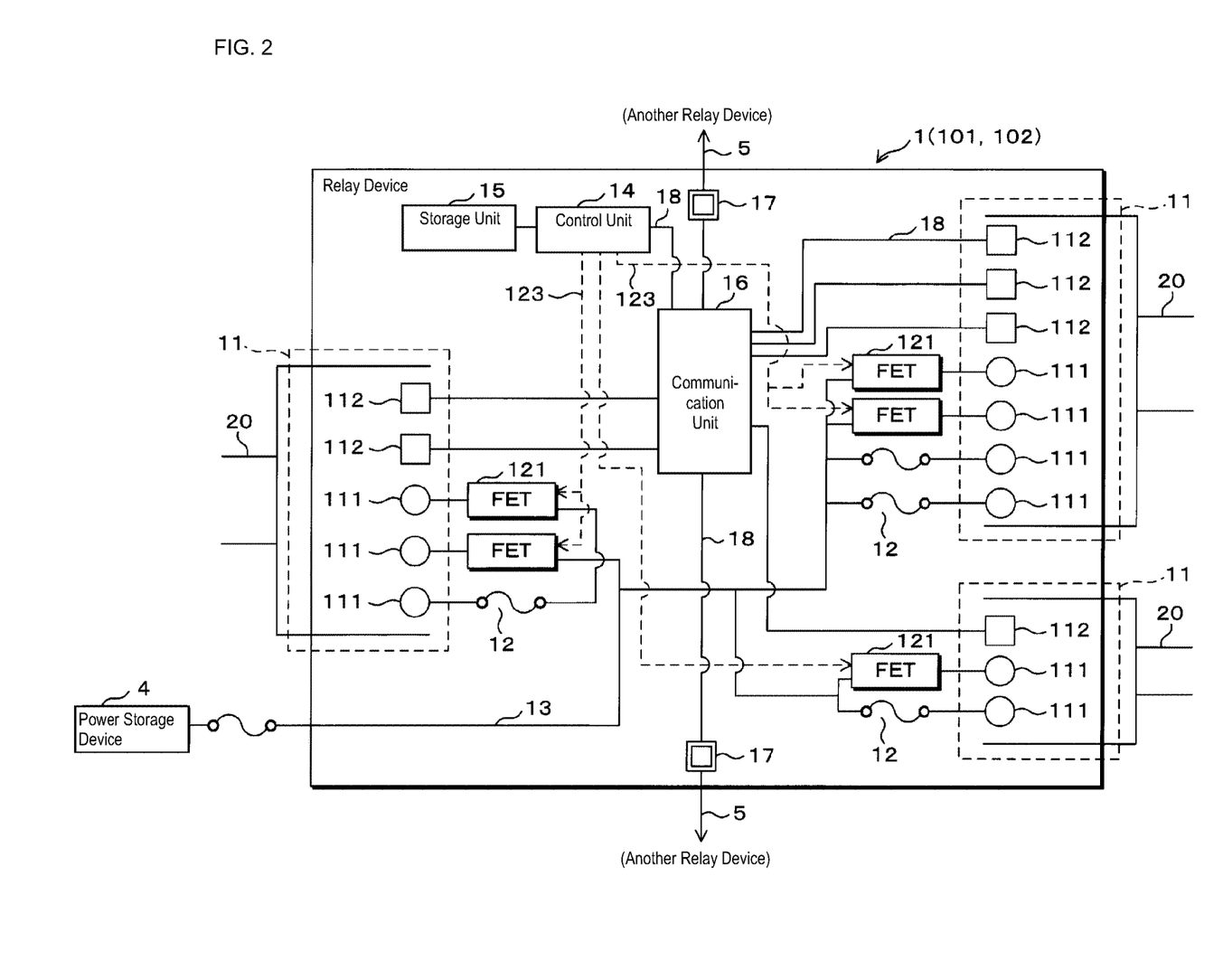
FIG. 2 is a block diagram illustrating a configuration of relay devices included in the in-vehicle system.

FIG. 2 is a block diagram illustrating a configuration of the relay devices 1 included in the in-vehicle system S. The relay devices 1, i.e., the first relay device 101 and the second relay device 102, each include a plurality of connectors 11. The number and types, such as shapes, of the plurality of connectors 11 are determined based on the number and types of harnesses 20 to be connected to the first relay device 101, or in order words, based on the in-vehicle loads 3 to be connected to these harnesses 20. The number of connectors 11 may be equal to the number of installation areas in the vehicle C (three in the illustration).

The connectors 11 each include a plurality of power output terminals 111 and one or more ECU-side communication ports 112. The connectors 11 may be a complex connector in which a pair of a power output terminal 111 and an ECU-side communication port 112 are integrated. The pair of the power output terminal 111 and the ECU-side communication port 112 is provided in accordance with the type of one of the in-vehicle loads 3 connected via a harness 20. The connectors 11 are not limited to including power output terminals 111 and ECU-side communication ports 112, and may only include either power output terminals 111 or ECU-side communication ports 112.

To each of the power output terminals 111, a fuse 12 or a semiconductor switch 121, which is a field effect transistor (FET) or the like, corresponding to the type of in-vehicle load 3 to be connected via a harness 20 is connected in series. The semiconductor switch 121, which is an FET or the like, is electrically connected to a control unit 14 via a control signal line 123, and functions as a semiconductor relay or a semiconductor fuse that is turned on or off in response to a control signal output from the control unit 14. A plurality of series circuits in which a power output terminal 111 and a fuse 12 or a semiconductor switch 121 are connected in series are connected in parallel with one another, and are connected to a power storage device 4, which is a lead battery, a lithium-ion battery, or the like, via a power line 13.

The power line 13 is branched in accordance with the number of connectors 11 (three in the illustration) inside the relay devices 1, and power output from the power storage device 4 is supplied to in-vehicle loads 3 after being distributed via two stages of branching, i.e., the branching by the number of connectors 11, and the branching by the number of power output terminals 111 included in each connector 11. That is, the relay devices 1 each function as a power relay device such as an electric distribution box or a junction box that relays, distributes, and thereby supplies the power output from the power storage device 4 to in-vehicle loads 3.

The relay devices 1, i.e., the first relay device 101 and the second relay device 102, each include a communication unit 16. The plurality of ECU-side communication ports 112 included in the individual connectors 11 are connected to the communication unit 16. The communication unit 16 relays data flowing through the plurality of ECU-side communication ports 112 connected thereto, and may function as a layer 2 switch, a layer 3 switch, or a CAN gateway, for example.

The ECU-side communication ports 112 are communication ports that support an Ethernet standard such as 100BASE-T1 or 1000BASE-T1, for example, and function as input/output interfaces in Ethernet-based communication. Alternatively, the ECU-side communication ports 112 may be CAN transceivers that support a CAN bus.

The relay devices 1, i.e., the first relay device 101 and the second relay device 102, include the control unit 14, a storage unit 15, and the communication unit 16. The control unit 14, the storage unit 15, and the communication unit 16 are connected via an internal bus 18 so as to be capable of communicating with one another.

The control unit 14 is formed by a central processing unit (CPU), a micro processing unit (MPU), or the like, and is configured so as to perform various types of control processing, computation processing, etc., by executing control programs and data stored to the storage unit 15 in advance. The control unit 14 may function as a layer 3 switch and perform control relating to relaying by executing a control program, etc. Alternatively, the control unit 14 may be formed by an IC chip in which a field programmable gate array (FPGA), an application specific integrated circuit (ASCI), or the like is used, and may perform control relating to relaying based on the circuit configuration (relay circuit) of the FPGA or the like. Otherwise, the control unit 14 and the storage unit 15 may be formed by a microcomputer in which the control unit 14 and the storage unit 15 are integrally packaged. The control unit 14 may perform conversion processing (protocol conversion) between different protocols, such as Ethernet and CAN.

The storage unit 15 is formed by a volatile memory element such as a random access memory (RAM) or a non-volatile memory element such as a read only memory (ROM), an electrically erasable programmable ROM (EEPROM), or a flash memory, and has control programs and data to be referred to during processing stored thereto in advance. The control programs stored in the storage unit 15 may be control programs stored after being read out by the control unit 14 from a readable recording medium (not illustrated). Otherwise, the control programs may be control programs stored to the storage unit 15 after being downloaded from an unillustrated external computer connected to an unillustrated communication network. Furthermore, information regarding path information (a routing table) defined based on communication protocols is stored to the storage unit 15 so that relay control can be performed.

A trunk-side communication port 17 for communication with other relay devices 1 is also connected to the communication unit 16. The trunk-side communication port 17 is a communication port that supports an Ethernet standard such as 100BASE-T1 or 1000BASE-T1, for example, and functions as an input/output interface in Ethernet-based communication. A communication line 5, which is an Ethernet cable or the like, for example, is connected to the trunk-side communication port 17, and a plurality of relay devices 1 are connected via the communication line 5 so as to be capable of communicating with one another. A trunk-side communication line is formed by the communication line 5, which connects the plurality of relay devices 1 so as to be capable of communicating with one another.

The relay devices 1 configured in such a manner each function as a communication relay device such as an Ether switch or a CAN gateway that relays communication between in-vehicle loads 3 such as in-vehicle ECUs connected to the communication unit 16 and relays communication between in-vehicle loads 3 connected to the device itself and in-vehicle loads 3 connected to other relay devices 1.

Each of the relay devices 1 may include two trunk-side communication ports 17. By including two trunk-side communication ports 17, the relay devices 1 can communicate with other relay devices 1 via a plurality of paths, and the redundancy of the in-vehicle network (trunk-side communication lines) formed by the plurality of relay devices 1 can be improved.

Embodiment 2

Figure 3:
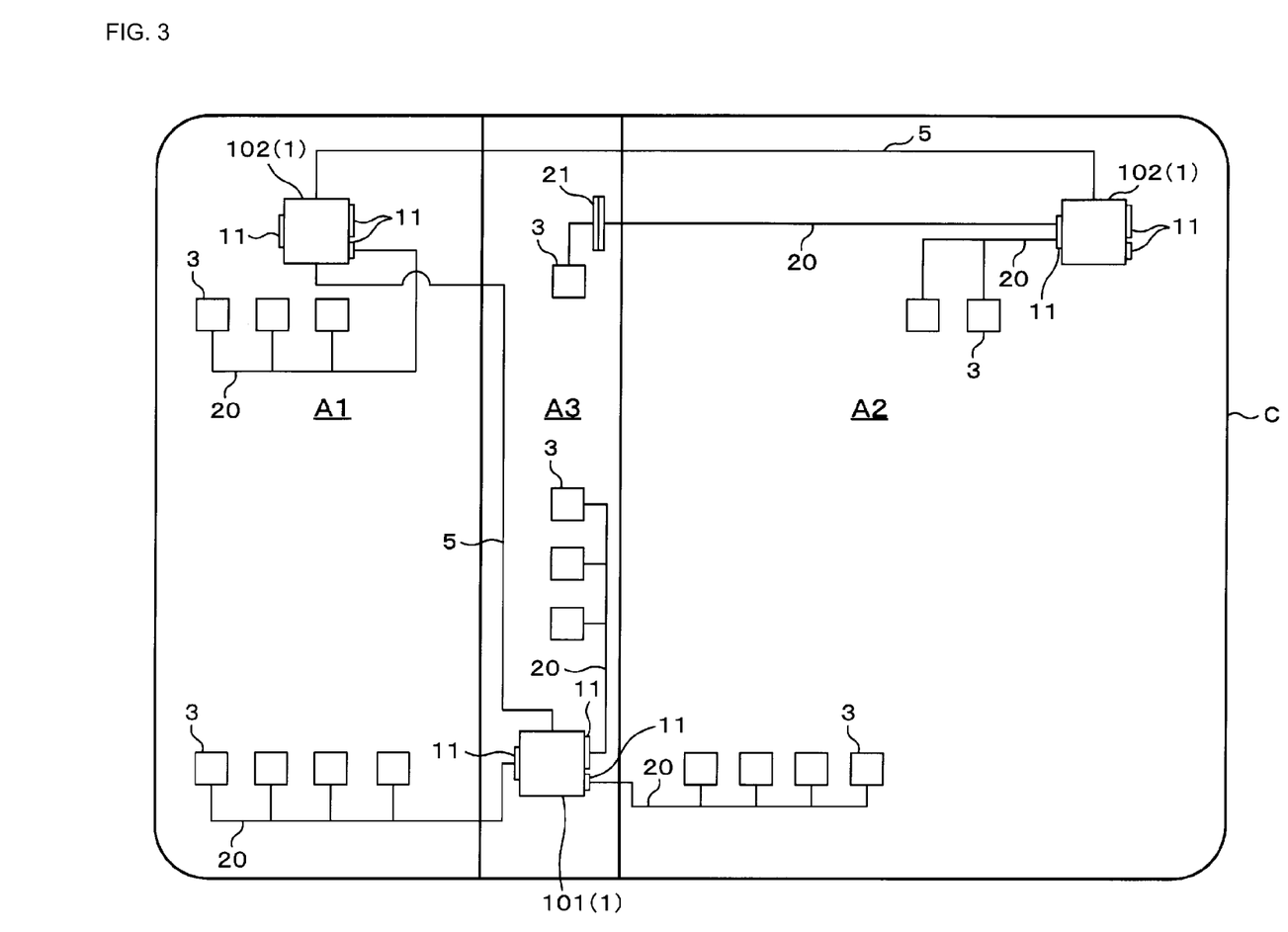
FIG. 3 is a schematic diagram illustrating an in-vehicle system according to embodiment 2.

FIG. 3 is a schematic diagram illustrating an in-vehicle system S according to embodiment 2. The first relay device 101 included in the in-vehicle system S according to embodiment 2 has connected thereto the greatest number of harnesses extended from installation areas different from the installation area in which the device itself is installed. In other words, when the relay devices 1 are installed in the installation areas, the relay device 1 having connected thereto the greatest number of harnesses 20 extended from installation areas different from the installation area in which the device itself is installed is used as the first relay device 101.

In the illustration of the present embodiment, the first relay device 101 in the instrument-panel area A3 has connected thereto two harnesses 20 extended from the engine-room area A1 and the floor area A2, which are installation areas different from the installation area in which the device itself is installed.

The second relay device 102 in the engine-room area A1 has connected thereto only a harness 20 extended from the engine-room area A1, which is the installation area in which the device itself is installed, and does not have connected thereto any harnesses 20 extended from installation areas different from the installation area in which the device itself is installed. The second relay device 102 in the floor area A2 has connected thereto one harness 20 extended from the instrument-panel area A3, which is an installation area different from the installation area in which the device itself is installed. In other words, in each second relay device 102, the number of harnesses 20 extended from installation areas other than the installation area in which the device itself (the second relay device 102) is installed is smaller than the number of harnesses 20 connected to the first relay device 101 (harnesses 20 extended from installation areas other than the installation area in which the first relay device 101 is installed).

Since the first relay device 101 is the relay device 1 having connected thereto the greatest number of harnesses 20 extended from installation areas different from the installation area in which the device itself is installed, the number of circuits of harnesses 20 can be reduced by directly connecting the harnesses 20 and the connectors 11 and eliminating relay connectors 21 connected to the first relay device 101. Accordingly, the number and types, such as shapes, of the connectors 11 of the relay devices 1 (the first relay device 101 and the second relay device 102) can be efficiently determined by using, as a reference, the first relay device 101 having connected thereto the greatest number of harnesses 20 extended from installation areas other than the installation area in which the device itself is installed.

Embodiment 3

Figure 4:
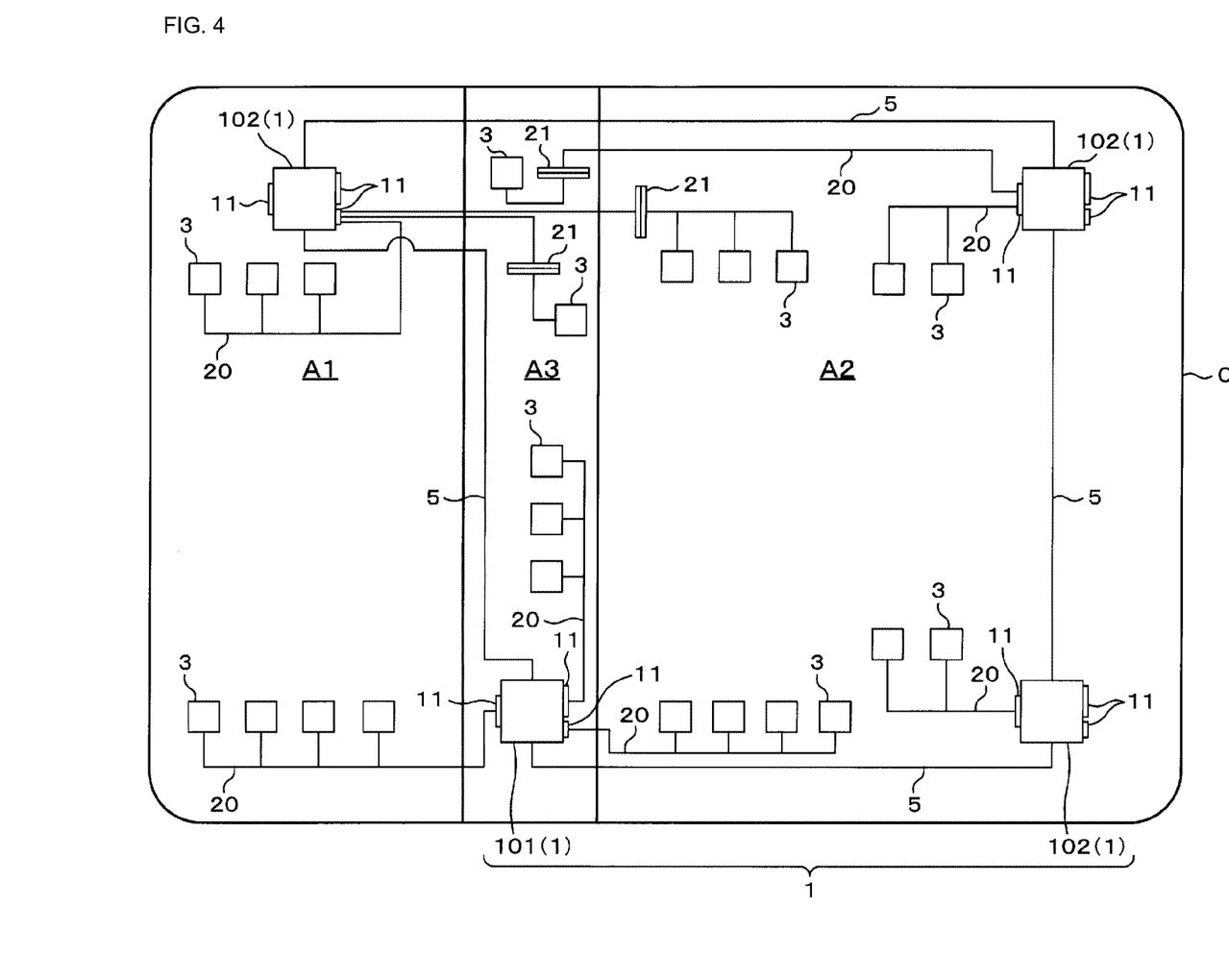
FIG. 4 is a schematic diagram illustrating an in-vehicle system according to embodiment 3.

FIG. 4 is a schematic diagram illustrating an in-vehicle system S according to embodiment 3. For example, the in-vehicle system S according to embodiment 3 includes one first relay device 101 and three second relay devices 102.

One of the three second relay devices 102 is installed in the engine-room area A1 as in embodiment 1, and the other two second relay devices 102 are installed in the floor area A2. The one first relay device 101 and the three second relay devices 102 each two trunk-side communication ports 17, and an in-vehicle network forming a ring-shaped network topology is formed by connecting the mutual trunk-side communication ports 17 of the relay devices to each other via communication lines 5 conforming to Ethernet, etc.

By forming an in-vehicle network by connecting relay devices 1 including the first relay device 101 and the second relay devices 102 to one another in a ring-shaped network topology, the relay devices 1 (the first relay device 101 and the second relay devices 102) can each communicate with other relay devices 1 via two paths, namely a clockwise path and a counterclockwise path, and traffic between the relay devices 1 during communication and relaying can be reduced.

Furthermore, in an in-vehicle network in which relay devices 1 are connected to one another in a ring-shaped network topology, communication between relay devices 1 can be ensured via one of the clockwise and counterclockwise paths even if a communication line 5 on the side of one trunk-side communication port 17 is disconnected or one of the trunk-side communication ports 17 is disabled, and redundancy in the in-vehicle network can be guaranteed.

Embodiment 4

Figure 5:
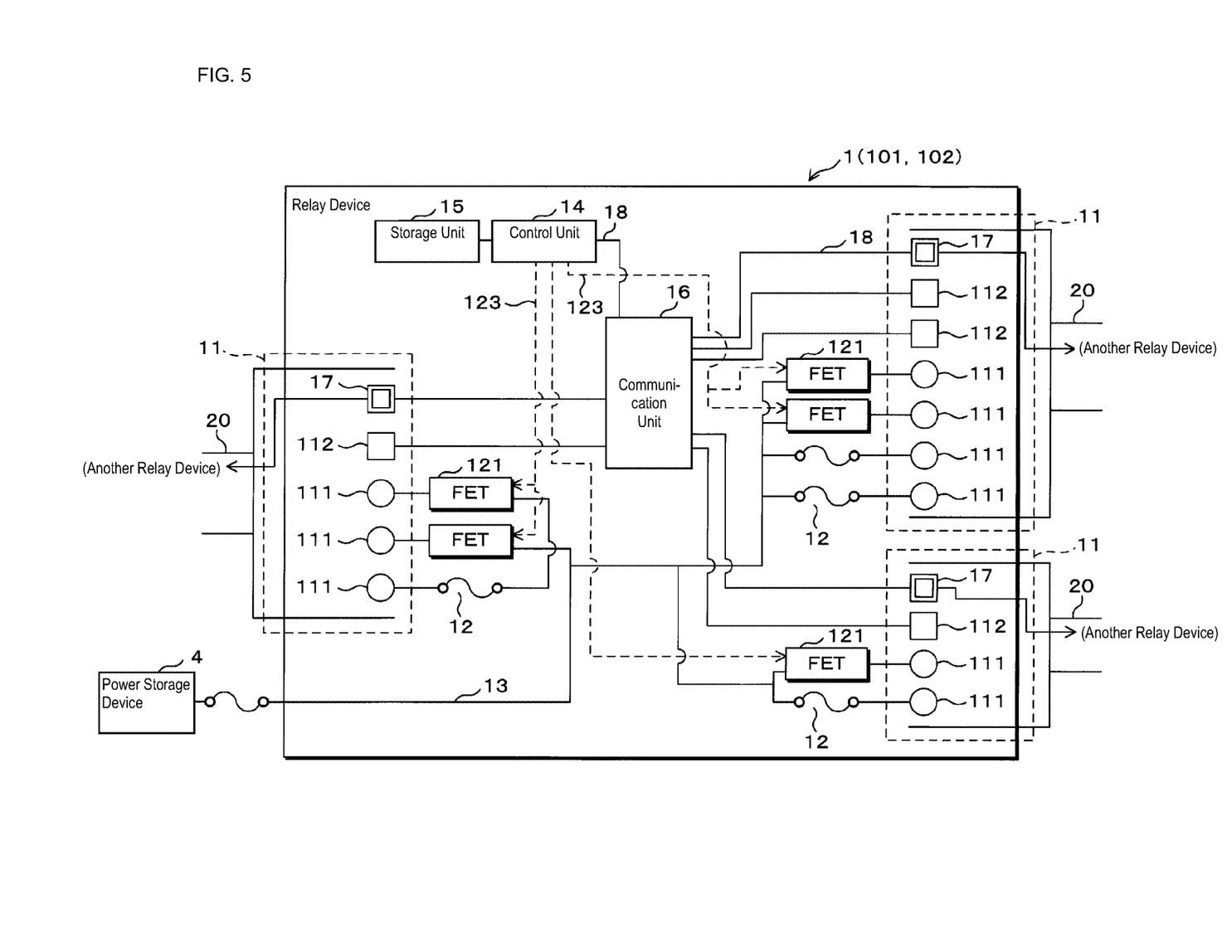
FIG. 5 is a block diagram illustrating a configuration of relay devices included in an in-vehicle system according to embodiment 4.
Figure 6:
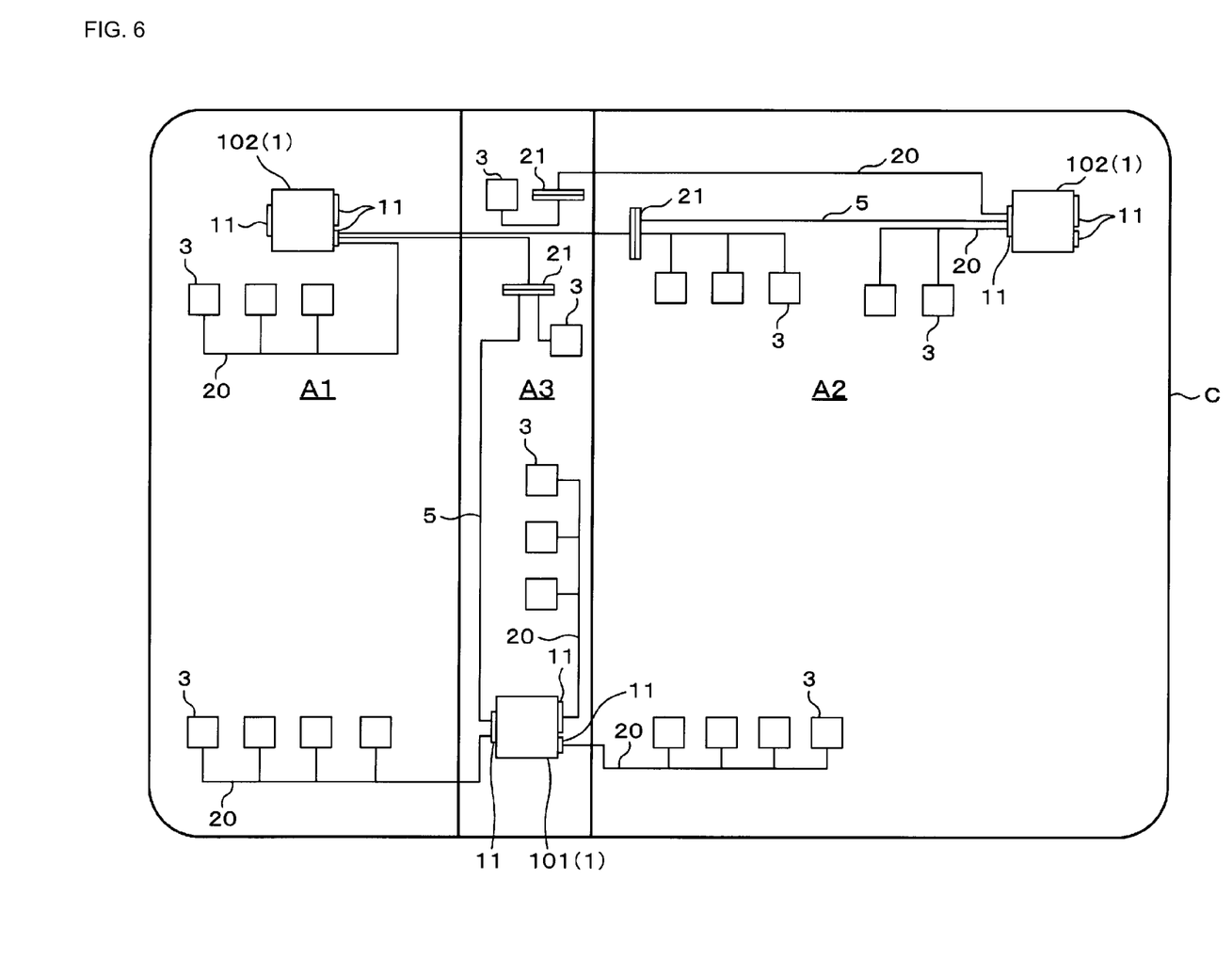
FIG. 6 is a schematic diagram illustrating the in-vehicle system.

FIG. 5 is a block diagram illustrating a configuration of the relay devices 1 included in an in-vehicle system S according to embodiment 4. FIG. 6 is a schematic diagram illustrating the in-vehicle system S. In embodiment 1, a description was provided regarding that, in the relay devices 1 included in the in-vehicle system S, a trunk-side communication port 17 for communicating with other relay devices 1 is arranged outside the connectors 11 including the ECU-side communication ports 112, etc. However, there is no limitation to this. In the relay devices 1 included in the in-vehicle system S according to embodiment 4, trunk-side communication ports 17 for communicating with other relay devices 1 are respectively arranged inside the connectors 11. That is, the connectors 11 of the relay devices 1 according to embodiment 4 each include a plurality of power output terminals 111, one or more ECU-side communication ports 112, and a trunk-side communication port 17.

The ECU-side communication ports 112 and the trunk-side communication port 17 included in each connector 11 are connected to the communication unit 16. The communication unit 16, by functioning as a layer 2 switch, a layer 3 switch, or a CAN gateway for example as described above, realizes the relaying-related functions of the ECU-side communication ports 112, the trunk-side communication ports 17, etc.

In the illustration of the present embodiment, the relay devices 1 each include three connectors 11 corresponding to the three installation areas. The three connectors 11 each include a trunk-side communication port 17 for communicating with other relay devices 1. In other words, the trunk-side communication port 17 included in each connector 11 is provided inside the connector 11 alongside the ECU-side communication ports 112, etc.

In the present embodiment, all of the connectors 11 included in the relay devices 1 include a trunk-side communication port 17. However, there is no limitation to this. For example, a trunk-side communication port 17 may be included in one or two or more connectors 11 out of the plurality of connectors 11 included in the relay devices 1.

The communication lines 5, which are Ethernet cables or the like that are connected to the trunk-side communication ports 17 and that connect the relay devices 1 with one another, are each routed in the vehicle C as one of the communication cables included in the harnesses 20.

The first relay device 101 in the instrument-panel area A3 and the second relay device 102 in the engine-room area A1 are connected to one another via a communication line 5 and a relay connector 21 installed in the instrument-panel area A3. The second relay device 102 in the engine-room area A1 and the second relay device 102 in the floor area A2 are connected to one another via a communication line 5 and a relay connector 21 installed in the floor area A2.

In a case as described above in which trunk-side communication ports 17 for communicating with other relay devices 1 are included in the connectors 11 and the trunk-side communication ports 17 are connected with one another via communication lines 5, communication lines 5 are routed so as to extend across different installation areas. However, communication lines 5 routed so as to extend across different installation areas can be split by interposing relay connectors 21 thereon.

In the present embodiment, the communication lines 5, which are Ethernet cables or the like connecting the relay devices 1 with one another, are connected via relay connectors 21. However, there is no limitation to this. The communication lines 5, which are Ethernet cables or the like connecting the relay devices 1 with one another, may be directly connected to the trunk-side communication ports 17 of the relay devices 1 without interposing relay connectors 21.

By providing the trunk-side communication ports 17 for communicating with other relay devices 1 inside the connectors 11 in a similar way to the ECU-side communication ports 112, etc., connection portions (connector portions) consisting of only the trunk-side communication ports 17 can be eliminated, and the size of the relay devices 1 can be reduced. Furthermore, communication between relay devices 1, and the supply of power and the relaying of communication to in-vehicle loads 3 such as sensors or in-vehicle ECUs can be realized by means of a single connector 11.

Figure 7:
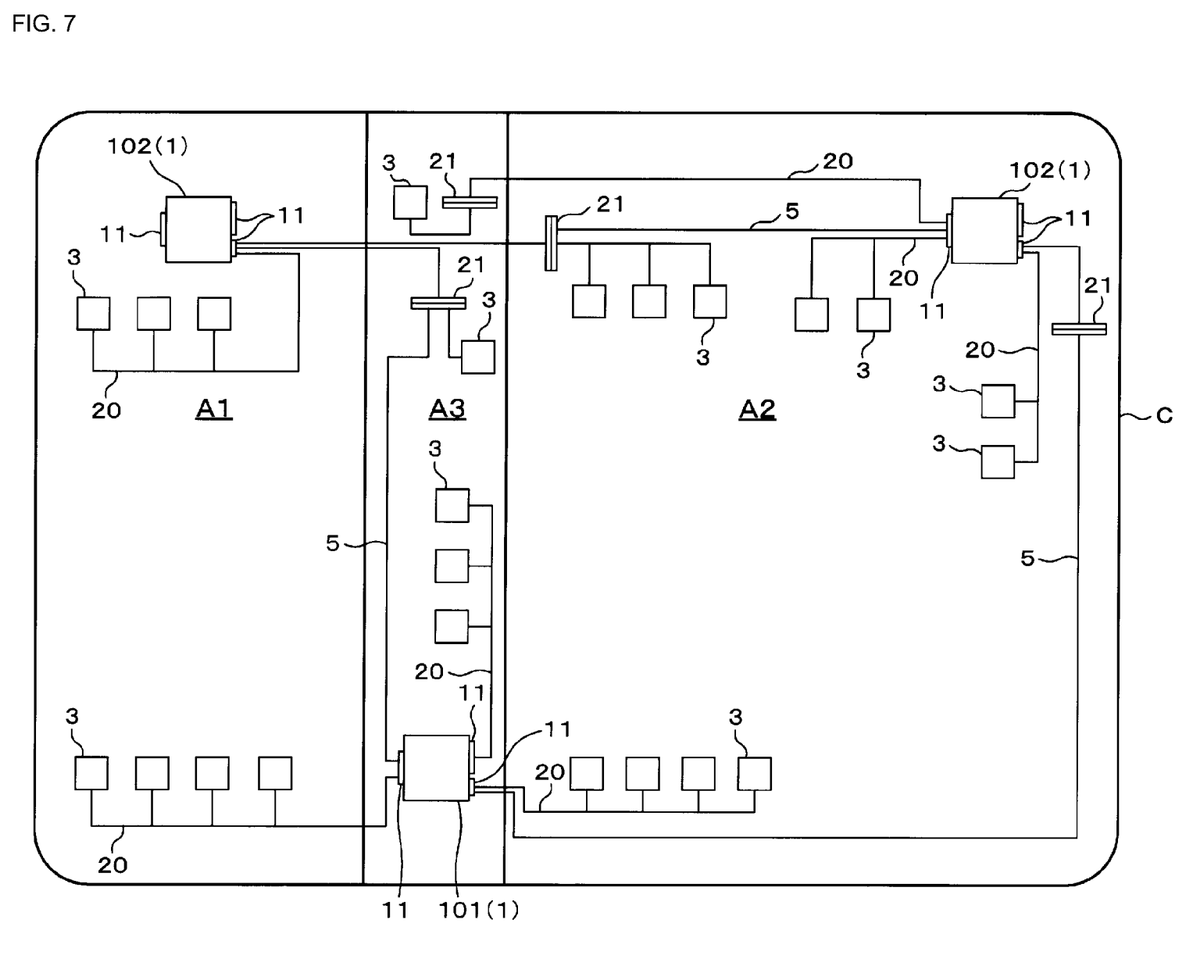
FIG. 7 is a schematic diagram illustrating an in-vehicle system according to embodiment 5.

FIG. 7 is a schematic diagram illustrating an in-vehicle system S according to embodiment 5. In the relay devices 1 included in the in-vehicle system S according to embodiment 5, trunk-side communication ports 17 for communicating with other relay devices 1 are arranged inside the connectors 11 as in the relay devices 1 according to embodiment 4.

One of the two second relay devices 102 is installed in the engine-room area A1 as in embodiment 1, and the other second relay device 102 is installed in the floor area A2. The one first relay device 101 and the two second relay devices 102 each include two trunk-side communication ports 17, and an in-vehicle network forming a ring-shaped network topology is formed by connecting the mutual trunk-side communication ports 17 of the relay devices via communication lines 5 conforming to Ethernet, etc. In other words, in the in-vehicle system S according to embodiment 5, the relay devices 1 are connected in a similar manner as in embodiment 4, and furthermore, the first relay device 101 and the second relay device 102 in the floor area A2 are connected to a communication line 5 via a relay connector 21 provided in the floor area A2 to form an in-vehicle network forming a ring-shaped network topology.

By forming an in-vehicle network forming a ring-shaped network topology in such a manner, communication between relay devices 1 can be ensured via a clockwise or counterclockwise path, and redundancy in the in-vehicle network can be guaranteed.

The embodiments disclosed herein are examples in every way, and shall be construed as being non-limiting. The scope of the present invention is not limited to what is defined above, and is intended to include all modifications that are indicated by the claims and are within the meaning and scope of equivalents of the claims.

The invention claimed is:

1. An in-vehicle system that is installed in a vehicle and that includes a plurality of relay devices,
    wherein the plurality of relay devices are installed in a plurality of installation areas partitioned in the vehicle and comprise a plurality of connectors corresponding in number to the plurality of installation areas,
    the number and shapes of the plurality of connectors are standardized between the plurality of relay devices,
    harnesses extended from the plurality of installation areas are connected to the plurality of connectors either directly or via relay connectors,
    the plurality of relay devices include:

a first relay device in which harnesses extended from different installation areas are connected to the plurality of connectors; and a second relay device other than the first relay device, and the number of relay connectors connected to the first relay device is no greater than the number of relay connectors connected to the second relay device.

2. The in-vehicle system according to claim 1, wherein a harness extended from a different installation area is connected to each of the connectors of the first relay device.

3. The in-vehicle system according to claim 1, wherein the number of harnesses extended and connected from installation areas other than the installation area in which the relay device itself is installed is greatest in the first relay device of the plurality of relay devices.

4. The in-vehicle system according to claim 1, wherein the number of relay connectors connected to the first relay device is zero, and harnesses extended from the plurality of installation areas are directly connected to the plurality of connectors of the first relay device.

5. The in-vehicle system according to claim 1, wherein, in the first relay device, the harnesses extended from the plurality of installation areas are connected to the plurality of connectors of the first relay device so that a plurality of harnesses extended from different installation areas are not present together at the same connector.

6. The in-vehicle system according to claim 1, wherein the relay connectors are each interposed between a harness extended from an installation area other than the installation area in which a relay device itself is installed and a connector to which the harness is to be connected.

7. The in-vehicle system according to claim 1, wherein the plurality of installation areas include:

an engine-room area in which driving-system in-vehicle devices of the vehicle are installed;

a floor area beneath a floor panel of the vehicle; and an instrument-panel area located between the engine-room area and the floor area, and the first relay device is installed in the instrument-panel area.

8. The in-vehicle system according to claim 1, wherein the plurality of relay devices each comprise a plurality of fuses that are connected to the plurality of connectors, and the types and number of the plurality of fuses are standardized between the plurality of relay devices.

9. The in-vehicle system according to claim 1, wherein the plurality of relay devices comprise communication ports for communicating with in-vehicle ECUs installed in the vehicle, and the number and shapes of the communication ports are standardized between the plurality of relay devices.

* * * * *